United States Patent [19]
Heydarpour et al.

[11] Patent Number: 5,843,540
[45] Date of Patent: Dec. 1, 1998

[54] MULTI-LAYER FLEXIBLE CONTAINER FOR FLOWABLE MATERIALS

[75] Inventors: Ramin Heydarpour, Vernon Hills; Ann-Magret Asp, Arlington Heights; Mehmet Kamil Tokatli, Chicago, all of Ill.

[73] Assignee: Tetra Laval Holdings & Finance, S.A., Pully, Switzerland

[21] Appl. No.: 749,442

[22] Filed: Nov. 15, 1996

[51] Int. Cl.⁶ .......................... B65D 30/08; B65D 75/00; B65D 75/58; B65D 27/28
[52] U.S. Cl. .......................... 428/35.2; 428/367
[58] Field of Search ..................... 426/106, 127; 428/34.1, 35.2, 35.4, 35.7, 36.6, 36.7

[56] References Cited

U.S. PATENT DOCUMENTS

| | | |
|---|---|---|
| 4,041,851 | 8/1977 | Jentsch . |
| 4,196,030 | 4/1980 | Ausnit ........................................ 156/91 |
| 4,452,378 | 6/1984 | Christine ................................. 222/107 |
| 4,454,979 | 6/1984 | Ikeda et al. ................................ 383/10 |
| 4,484,351 | 11/1984 | de Leeuwe et al. . |
| 4,503,102 | 3/1985 | Mollison .............................. 206/524.9 |
| 4,521,437 | 6/1985 | Storms . |
| 4,837,849 | 6/1989 | Erickson et al. . |
| 5,288,531 | 2/1994 | Falla et al. .............................. 428/35.2 |
| 5,334,180 | 8/1994 | Adolf et al. ............................. 604/411 |
| 5,360,648 | 11/1994 | Falla et al. .............................. 428/35.2 |
| 5,374,459 | 12/1994 | Mumpower et al. ................... 428/36.7 |
| 5,547,284 | 8/1996 | Imer ........................................ 383/104 |
| 5,576,038 | 11/1996 | Moore et al. ........................... 426/127 |
| 5,691,070 | 11/1997 | Watanabe et al. ...................... 428/516 |
| 5,693,418 | 12/1997 | Shigemoto et al. .................... 428/342 |
| 5,733,617 | 3/1998 | Baduel ................................... 428/36.8 |

FOREIGN PATENT DOCUMENTS

| | | |
|---|---|---|
| 9521743 | 8/1995 | WIPO . |
| 95/33621 | 12/1995 | WIPO . |
| 9611859 | 4/1996 | WIPO . |

Primary Examiner—Robert H. Harrison
Attorney, Agent, or Firm—Michael A. Catania

[57] ABSTRACT

A flexible container for a flowable material fabricated from a multi-layer film which may include an interior layer, an exterior layer and a core layer. The core layer is composed of a blend of approximately 40 to 60 parts of a polyethylene material having a density greater than 0.930, approximately 40 to 60 parts of a linear copolymer of ethylene and a $C_4$–$C_{10}$ alpha-olefin having a density between 0.900 to 0.930 g/cm3 and a melt index of 0.20 to 2.0 dg/min, and approximately from 0 to 10 parts of an additive. The interior layer may be composed of a material selected from the group consisting of a linear copolymer of ethylene and a $C_4$–$C_{10}$ alpha-olefin, ethylene vinyl acetate, a metallocene catalyzed linear low density polyethylene, and any mixture thereof. The exterior layer is composed of a material selected from the group consisting of surlyn, metallocene catalyzed linear low density polyethylene, a linear copolymer of ethylene and a $C_4$–$C_{10}$ alpha-olefin, a low density polyethylene, a medium density polyethylene, a high density polyethylene, ethylene vinyl acetate and any mixture thereof. The flexible container is self-supporting when filled with the flowable material. The flexible container has a relatively planar bottom section. The flexible container may have a resealable opening for dispensing the flowable material whereby the flexible container is compressible as the amount of flowable material inside the flexible container is reduced.

8 Claims, 3 Drawing Sheets

MULTI-LAYER FLEXIBLE CONTAINER FOR FLOWABLE MATERIALS

TECHNICAL FIELD

The present invention relates to a flexible container for flowable materials. Specifically, the present invention relates to a self-supporting flexible container when filled with a flowable material, the flexible container composed of multiple layers of polymeric materials.

BACKGROUND

It is well known that heat-sealable polyethylene film may be fabricated into disposable pouches for the packaging of liquids and other flowable materials. These pouches are commonly used as consumer packaging for containing fruit juices and milk. The pouches, once filled with a desired contents and sealed at a production center, are transported to a store for the ultimate distribution to the consumer. The consumer, with his or her subjective preferences, will have the choice of purchasing a flowable material contained in a disposable pouch or in a more traditional package such as a plastic bottle, paper carton or metal can. In order to overcome the consumer's time-fortified preferences for the more traditional packaging, a disposable pouch must be able to provide the consumer with an assurance that the pouch is safe (the contents) and is able to withstand the same handling treatment as the traditional package.

A polyethylene pouch as consumer packaging for flowable materials has numerous advantages over traditional packages such as glass bottles, paper cartons and high density polyethylene jugs. Compared to these traditional packages, a polyethylene pouch consumes less raw material, requires less space in a landfill, is recyclable, can be processed easily, requires less storage space, requires less energy for chilling because of increased heat transference, and can be readily incinerated. A polyethylene pouch is also reusable as a general purpose storage bag.

Flowable materials are usually packaged in a polyethylene pouch through a form, fill and seal machine. The operation of the form, fill and seal machine commences with the unwinding of a web of thermoplastic film which is then formed into a continuous tube in a tube forming section, by sealing the longitudinal edges of the film together to form a fin seal (the forming aspect of the machine). The tube thus formed is pulled vertically toward a filling station. The tube is then collapsed across a transverse cross-section of the tube, the position of the cross s-section being at a sealing device. The sealing device makes a first transverse heat seal at the collapsed portion of the tube thereby creating an airtight seal across the tube. The sealing device generally comprises a pair of jaws which contain a heating element, the jaws closing upon the tube and the heating element heating to form the airtight seal. Subsequent to sealing the tube and prior to the opening of the jaws, a predetermined quantity of a desired contents is deposited into the tube to a predetermined level upward from the first transverse seal (the filling aspect of the machine). The tube is then moved downward to a predetermined position whereby the level of the desired contents is below the jaws of the sealing device. The jaws of the sealing device are again closed, thereby collapsing the tube at a second transverse section and creating a second transverse heat seal (the sealing aspect of the machine). During the second closing of the jaws, the sealing device clamps, seals and severs the tube transversely. A pouch filled with a flowable material is now ready for further transportation. Thus, during the second closing, the sealing device has sealed the top of the filled pouch, severed this pouch from the rest of the tube, and sealed the bottom of the next-to-be filled pouch. An example of a form, fill and seal machine is the TETRA POUCH™, available from Tetra Pak, Inc., Chicago, Ill.

An example of a pouch fabricated on a similar machine is disclosed in Storms, U.S. Pat. No. 4,521,437 for Pouches Of Ethylene/Octene-1 Copolymer Film Containing A Flowable Material. Another example of similar pouch is disclosed in Breck et al, International Publication Number WO 95/21743, for a Multilayer Ethylene Copolymer Film. Still another example of a similar pouch is Falla et al, U.S. Pat. No. 5,360,648, for a Pouch For Packaging Flowable Materials. A different type of pouch is disclosed in Erickson et al, U.S. Pat. No. 4,837,849 for a Stand-Up Plastic Bag And Method Of Making The Same. The container of Erickson et al is distinguishable from the afore-mentioned pouches in that it stands-up similar to more familiar packaging. However, the gusseted bottom and overall appearance of the container is not traditional in the sense of gallon jugs or milk cartons. What is needed is a container for flowable materials which has the afore-mentioned beneficial attributes of space-saving features, recycleability and being environmentally friendly while providing a more traditional appearance for the consumer and providing the durability expected by a consumer. Also, consumers traditionally expect easily resealable methods for dispensing of the content of the container.

The foregoing patents, although efficacious in the protection of their contents, are not the denouement of the problems of the packaging industry. There are still unresolved problems which compel the enlargement of inventions in the packaging industry.

SUMMARY OF THE INVENTION

The present invention provides the consumer with a package for flowable materials that includes a traditional appearance with durability while providing many benefits such as space-saving features, recycleability and being environmentally friendly. The present invention is able to accomplish this through a novel flexible container composed of a novel film structure which greatly enhances the durability of the container.

One aspect of the present invention is a flexible container for a flowable material. The flexible container is fabricated from a multi-layer film. The flexible container comprises an interior layer, an exterior layer and at least one core layer. The interior layer is in contact with the flowable material. The interior layer is capable of being utilized as a sealing layer. The interior layer is composed of a material selected from the group consisting of a linear copolymer of ethylene and a $C_4$–$C_{10}$ alpha-olefin, ethylene vinyl acetate, a metallocene catalyzed linear low density polyethylene, and any mixture thereof. The exterior layer is capable of being utilized as a print layer. The at least one core layer is interposed between the exterior layer and the interior layer. The at least one core is composed of a blend of approximately 40 to 60 parts of a polyethylene material having a density greater than 0.930, approximately 40 to 60 parts of a linear copolymer of ethylene and a $C_4$–$C_{10}$ alpha-olefin having a density between 0.900 to 0.930 g/cm3 and a melt index of 0.20 to 2.0 dg/min, and approximately from 0 to 10 parts of an additive. The flexible container is self-supporting when filled with the flowable material.

The exterior layer may be composed of a material selected from the group consisting of surlyn, metallocene catalyzed linear low density polyethylene, a linear copolymer of ethylene and a $C_4$–$C_{10}$ alpha-olefin, a low density polyethylene, a medium density polyethylene, a high density polyethylene, ethylene vinyl acetate and any mixture thereof. In a preferred embodiment, the interior layer may comprise a blend of approximately 80 parts of a linear copolymer of ethylene and a $C_4$–$C_{10}$ alpha-olefin and approximately 20 parts of an ethylene vinyl acetate. The linear copolymer may have a density between 0.900 to 0.930 g/cm$^3$ and a melt index of 0.20 to 2.0 dg/min. The ethylene vinyl acetate may have a weight ratio of ethylene to vinyl acetate of approximately 33:1 to 50:1 and a melt index of approximately 0.2 to 10 dg/min.

The flexible container may have a relatively planar bottom section. The relatively planar bottom of the flexible container may be formed from at least one folded triangular flap. Alternatively, the relatively planar bottom may be formed by two folded triangular flaps which are affixed to the bottom of the flexible container at the points of the triangular flaps. The flexible container may further comprise a resealable opening for dispensing the flowable material whereby the flexible container is compressible as the amount of flowable material inside the flexible container is reduced. The resealable opening may be a fitment, including a spout, which has been affixed to the flexible container. The flexible container may further comprise a diagonal seal across an upper portion of the flexible container thereby forming a handle portion. The handle portion may have at least one elongated aperture for carrying the flexible container. The elongated aperture may be in the shape of a C and may be formed by heat-incision of the handle portion. Alternatively, the handle portion may have two apertures for carrying the flexible container. The flexible container may further comprise a barrier layer for substantially increasing the impermeability of the flexible container to various gases. The gases may include oxygen, carbon dioxide or water vapor. The flowable material may be a liquid food product. In a preferred embodiment, the flowable material is milk, particularly low-fat milk. In a preferred embodiment, the exterior layer may be a blend of approximately 10 to 100 parts of a metallocene catalyzed $C_4$–$C_{10}$ alpha-olefin polyethylene having a density between 0.88 to 0.93 g/cm$^3$ and a melt index of 0.2 to 2.0 dg/min, and approximately 0 to 90 parts of a polyethylene material.

Another aspect of the present invention is a flexible container for a flowable material fabricated on a form, fill and seal machine from a multi-layer film having an interior layer, an exterior layer and at least one core disposed between the interior and exterior layers. The flexible container is prepared in accordance with a method comprising several steps performed on the form, fill and seal machine. The first step is folding the multi-layer film in half with the exterior layer on the outside of the folded multi-layer film as a roll of the multi-layer film is unwound on the machine. The next step is longitudinally sealing an open edge of the folded multi-layer film. The next step is transversely sealing the folded multi-layer film to create a partially-formed container. The next step is diagonally sealing the partially-formed container to create a flowable material section and a handle section. The next step is dispensing a predetermined amount of the flowable material into the partially-formed container. The next step is cutting and transversely sealing the folded multi-layer film to create an individual flexible container. The next step is pressing on the flexible container to form at least one bottom flap. The final step is securing the at least one bottom flap to the flexible container whereby the flexible container is self-supporting when filled with the flowable material.

The method may further comprise the step of punching an incision into a folded edge of the folded multi-layer film prior to the step of longitudinally sealing the folded multi-layer film. The method may further comprise the steps of inserting a fitment into the incision and sealing the fitment to the folded multi-layer film prior to the step of punching an incision into a folded edge of the folded multi-layer film. The method may further comprise the step of cutting through the handle section to form at least one elongated aperture for carrying the flexible container prior to the step of cutting the folded multi-layer film.

The interior layer may be capable of being utilized as a sealing layer. The interior layer may comprise a material selected from the group consisting of a linear copolymer of ethylene and a $C_4$–$C_{10}$ alpha-olefin, ethylene vinyl acetate, a metallocene catalyzed linear low density polyethylene, and any mixture thereof. The at least one core layer is interposed between the exterior layer and the interior layer. The at least one core layer may comprise a blend of approximately 40 to 60 parts of a polyethylene material having a density greater than 0.930, approximately 40 to 60 parts of a linear copolymer of ethylene and a $C_4$–$C_{10}$ alpha-olefin having a density between 0.900 to 0.930 g/cm3 and a melt index of 0.20 to 2.0 dg/min, and approximately from 0 to 10 parts of an additive. The exterior layer may comprise a material selected from the group consisting of surlyn, metallocene catalyzed linear low density polyethylene, a linear copolymer of ethylene and a $C_4$–$C_{10}$ alpha-olefin, a low density polyethylene, a medium density polyethylene, a high density polyethylene, ethylene vinyl acetate and any mixture thereof.

In a preferred embodiment, the interior layer may comprise a blend of approximately 80 parts of a linear copolymer of ethylene and a $C_4$–$C_{10}$ alpha-olefin and approximately 20 parts of an ethylene vinyl acetate. The linear copolymer may have a density between 0.900 to 0.930 g/cm$^3$ and a melt index of 0.20 to 2.0 dg/min. The ethylene vinyl acetate having a weight ratio of ethylene to vinyl acetate of approximately 33:1 to 50:1 and a melt index of approximately 0.2 to 10 dg/min. The multi-layer film for the flexible container may further comprise a barrier layer for substantially increasing the impermeability of the flexible container to various gases. The barrier layer may be a core layer, the exterior layer or an additional layer. In a preferred embodiment, the exterior layer is a blend of approximately 10 to 100 parts of a metallocene catalyzed $C_4$–$C_{10}$ alpha-olefin polyethylene having a density between 0.88 to 0.93 g/cm$^3$ and a melt index of 0.2 to 2.0 dg/min, and approximately 0 to 90 parts of a polyethylene material.

Still another aspect of the present invention is a film structure for a flexible container for a flowable material. The film structure comprises an interior layer, an exterior layer and at least one core layer. The interior layer is in contact with the flowable material. The interior layer is capable of being utilized as a sealing layer. The interior layer is composed of a material selected from the group consisting of a linear copolymer of ethylene and a $C_4$–$C_{10}$ alpha-olefin, ethylene vinyl acetate, a metallocene catalyzed linear low density polyethylene, and any mixture thereof. The exterior layer is capable of being utilized as a print layer. The at least one core layer is interposed between the exterior layer and the interior layer. The at least one core layer is composed of a blend of approximately 40 to 60 parts of a polyethylene material having a density greater than 0.930, approximately 40 to 60 parts of a linear copolymer of ethylene and a $C_4$–$C_{10}$ alpha-olefin having a density between 0.900 to 0.930 g/cm3 and a melt index of 0.20 to 2.0 dg/min, and approximately from 0 to 10 parts of an additive.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE DRAWINGS

Several features of the present invention are further described in connection with the accompanying drawings in which:

There is illustrated in FIG. 1 a perspective view of one embodiment of the flexible container of the present invention.

There is illustrated in FIG. 2 a cross-sectional view of one embodiment of the film structure for the flexible container of the present invention.

There is illustrated in FIG. 3 a cross-sectional view of an alternative embodiment of the film structure for the flexible container of the present invention.

There is illustrated in FIG. 4 a perspective view of a packaging machine utilized in fabricating the flexible container of the present invention.

DETAILED DESCRIPTION OF THE PREFERRED EMBODIMENTS

Figure 1:
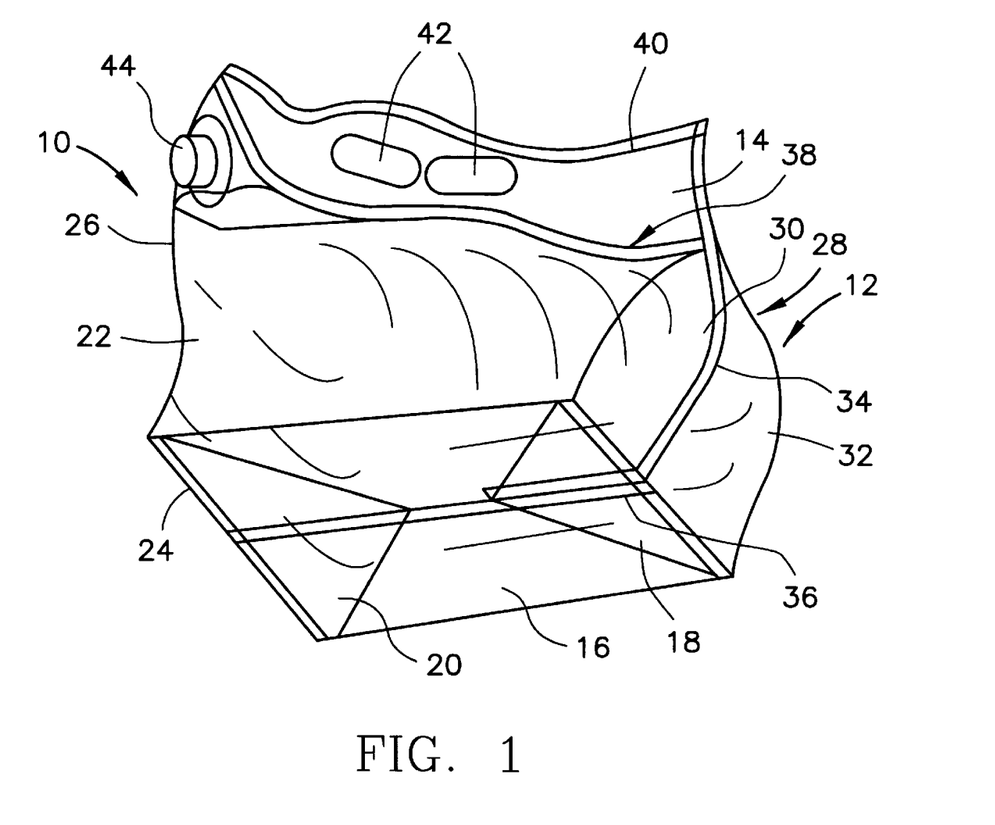

There is illustrated in FIG. 1 a perspective view of one embodiment of the flexible container of the present invention. As shown in FIG. 1, the flexible container is generally designated 10. The flexible container 10 may be divided into a flowable material section generally designated 12 and a handle section 14. The flowable material section 12 may further be defined by bottom portion 16, bottom triangular flaps 18 and 20, a front wall 22, a starboard sidewall 24, a port sidewall 26 and a rear wall 28. The rear wall 28 consists of a rear port section 30 and a rear starboard section 32 joined together by a longitudinal seal 34. The longitudinal seal 34 is made on the form, fill and seal machine as described below.

A first transverse seal 36 is made prior to filling the partially-formed container with the flowable material. A diagonal transverse seal 38 divides the flowable material section 12 and the handle section 14. A second transverse seal 40 or cut seal defines the top of the flexible container 10. The elongated apertures 42 are formed by a grip seal which heats and cuts the apertures 42 into the handle section 14 to provide for easy carrying of the flexible container 10.

A fitment 44 is affixed to the upper part of the front wall 22. The fitment 44 allows for resealable means of dispensing the flowable material from the flexible container 10. In a preferred embodiment, the flexible container 10 is designed to hold four liters of flowable material. However, those skilled in the pertinent art will recognize that flexible containers 10 may be designed to hold greater or lesser amounts of flowable material without departing from the scope of the present invention.

The flexible container is designed to be self-supporting when filled with a flowable material. The flexible container 10 maintains its self-supporting position until virtually all of its contents have been dispensed. The flowable material is easily dispensed from the flexible container 10 through the opened fitment 44 by pressing on the flexible container 10. Thus, even the last eighth of flowable material inside the flexible container 10 may be dispensed without having to lift the flexible container 10 off of a countertop. The flexible container also compresses as the amount of flowable material is reduced thereby saving on space in the refrigerator. This compressibility feature also allows for the saving of space in landfills.

Figure 2:
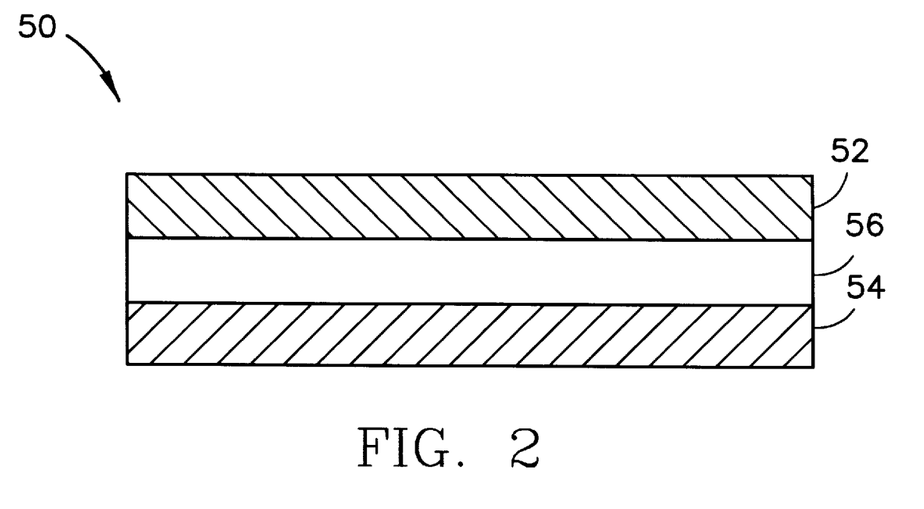
Figure 3:
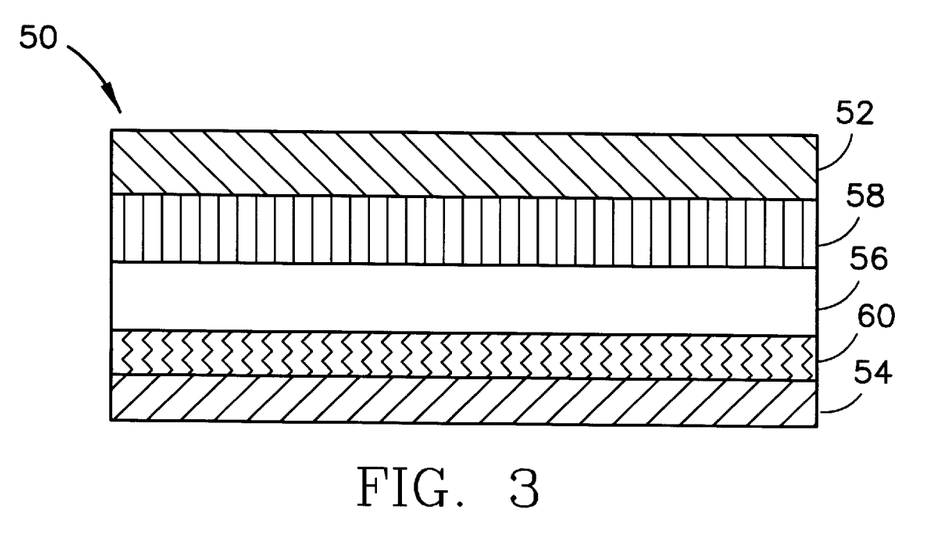

There is illustrated in FIG. 2 a cross-sectional view of one embodiment of the film structure for the flexible container of the present invention. There is illustrated in FIG. 3 a cross-sectional view of an alternative embodiment of the film structure for the flexible container of the present invention. As shown in FIG. 2, a film structure is generally designated 50. The film structure 50 for the flexible container 11 may consists of an interior layer 52, an exterior layer 54 and at least one core layer 56. Alternatively, as shown in FIG. 3, the film structure 50 may consists of additional core layers 58 and 60. Although the film structure of the present has been illustrated with three layers and five layers structures, those skilled in the pertinent art will recognize that other multilayer structures may be utilized in practicing the present invention without departing from the scope and content of the present invention.

The interior layer 52 may be utilized as a seal layer on a form, fill and seal machine. The interior layer 52 may be composed of a material selected from the group consisting of a linear copolymer of ethylene and a $C_4$–$C_{10}$ alpha-olefin, ethylene vinyl acetate, a metallocene catalyzed linear low density polyethylene, and any mixture thereof. In a preferred embodiment, the interior layer comprises a blend of approximately 80 parts of a linear copolymer of ethylene and a $C_4$–$C_{10}$ alpha-olefin and approximately 20 parts of an ethylene vinyl acetate. The linear copolymer having a density between 0.900 to 0.930 g/cm$^3$ and a melt index of 0.20 to 2.0 dg/min. The ethylene vinyl acetate having a weight ratio of ethylene to vinyl acetate of approximately 33:1 to 50:1 and a melt index of approximately 0.2 to 10 dg/min. A useful C6 linear low density polyethylene having the tradename ESCORENE® and manufactured by Exxon Chemical Company is a possible material for use in the interior layer, either alone or as part of a blend. A useful ethylene vinyl acetate is available from Quantum Chemical.

The exterior layer 54 may be composed of a material selected from the group consisting of surlyn, metallocene catalyzed linear low density polyethylene, a linear copolymer of ethylene and a C4–C10 alpha-olefin, a low density polyethylene, a medium density polyethylene, a high density polyethylene, ethylene vinyl acetate and any mixture thereof. The exterior layer 54 may also perform as a print layer for the flexible container 10. In a preferred embodiment, the exterior layer 54 is a blend of approximately 10 to 100 parts of a metallocene catalyzed C4–C10 alpha-olefin polyethylene having a density between 0.88 to 0.93 g/cm$^3$ and a melt index of 0.2 to 2.0 dg/min, and approximately 0 to 90 parts of a polyethylene material. A useful metallocene is available from Dow Chemical Company. Additionally, a Surlyn material may be used as the exterior layer 54. Further, a very low density polyethylene material having a density below 0.912 g/cm$^3$ may be used for the exterior layer 54.

The at least one core layer 56 is interposed between the exterior layer 54 and the interior layer 56. In a preferred embodiment, the at least one core layer is composed of a blend of approximately 40 to 60 parts of a polyethylene material having a density greater than 0.930, approximately 40 to 60 parts of a linear copolymer of ethylene and a C4–C10 alpha-olefin having a density between 0.900 to 0.930 g/cm3 and a melt index of 0.20 to 2.0 dg/min, and approximately from 0 to 10 parts of an additive. The other core layers 58 and 60 may be composed of a similar blend of material. Alternatively, the other core layers may be composed of a barrier material for preventing the ingress and egress through the walls of the flexible container 10 of gases such as oxygen, carbon dioxide and aromatics.

The thickness of the film structure 50 for the flexible container 10 may vary depending on the application. A preferred embodiment has a thickness of 139.9 microns with the core layer(s) 56–60 being 99.9 microns in thickness, the interior layer 52 being 20 microns in thickness and the exterior layer 54 being 20 microns in thickness. However, those skilled in the pertinent art will recognize that other thickness for the film structure 50 and the individual layers 52–60 may be used in practicing the present invention without departing from the scope of the present invention.

Figure 4:
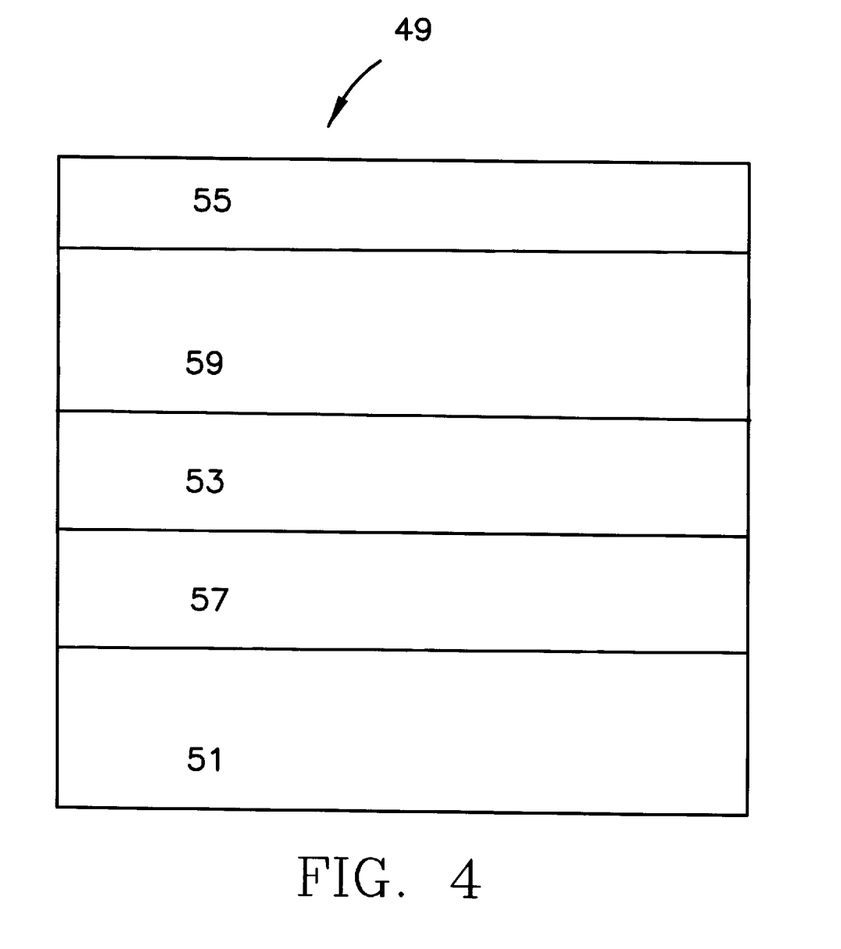

The following is a preferred method for fabricating the flexible container 10 of the present invention. There is illustrated in FIG. 4 a perspective view of a packaging machine 70 utilized in fabricating the flexible container 10 of the present invention. As shown in FIG. 4, a material roll 72 is placed on a bobbin 74. The bobbin 74 is attached to the unwinding motor, not shown. This motor is controlled by the position of the dancer roller 76 in order to keep a constant tension on the material. This dancer roller 76 can also indicate when the material roll 72 has come to an end and needs to be replaced. When this happens the material is cut by the operator near the splicing table 78. The old roll core is removed and a new material roll 72 is placed on the bobbin 74. The material is then spliced together on the splicing table 78.

After the material goes through the dancer roller 76, the material passes through a series of rollers that orient it to be as flat and smooth as possible. This is necessary for the ultrasonic edge guide sensors, not shown. The sensors determine if the material is centered coming into the folding triangle 82. If it is not centered, a motor located at the top of the folding triangle 82 swings the triangle 82 to one side or the other. The pivot point of the movement is the top of the triangle 82. As the material leaves the folding triangle 82 it is apparent that the material has been folded perfectly in half with the print on the outside of the material.

Immediately above the folding triangle 18 is another roller 84 driven by a motor. The material goes between this roller 84 and a tension roller 86. A potentiometer, not shown, is connected to the dancer roller 76 located between the folding triangle 82 and the back stretching servo motor 88. This potentiometer varies the speed of the motor 88 above the folding triangle 82 based on the position of second dancer roller 90. This dancer roller 90 has another purpose too. Although not shown to size in the figure, this dancer roller's 90 diameter equals that of the diameter of the roller before it plus the diameter of the roller after it. This gives equal surface contact to both sides of the folded material and keeps equal tension on them. The material is now approaching the vertical line 92 of the machine 70.

The first station on the vertical line 92 is the back stretching servo motor 88. As the material is indexed downward (to be described later) it has the momentum of both its own weight and that of the product. Because of this, it sometimes continues to travel downward after the indexing has stopped. After the indexing has stopped the back stretching servo motor 88 pulls the material in the opposite direction of the indexing until the photocell sensors, not shown, at a second station 94 detect the registration mark. Also happening at the second station 94, a mechanical punch 96, not shown, punches a hole in the folded (not open) edge of the material. Later the closure will be placed over this hole.

At a third station 98, the closure, or fitment, is applied to the package. The closures are sorted and oriented near the back of the machine (not shown) and blown through a tube to the front of the machine 70 where they are placed in the horn of an ultra sonic sealing machine 100, not shown. With the help of several pneumatically controlled "fingers" from both outside and inside the folded material, the hole that was punched earlier is centered over the anvil of the ultra sonic sealing machine 100. The horn and the anvil of the ultra sonic sealing machine 100 then come together to ultra sonically weld the closure onto the outside of the material. Please notice that the filling pipe 102 is inserted into the center of the folded material at this point. The fourth station 104 has two operations. The first is the design correction photocells 106, not shown. These photocells 106 look for the registration bar-code. Based on the state of the machine (filling, not filling, etc.) the indexing of the material is adjusted after this registration bar-code is seen by the photocells 106. The second operation performed at the fourth station 104 is the realigning of the open edges of the material. This is done by an edge guide 108, not shown (also known as rattle snake guide). This guide 108 independently adjusts the position of both edges. Since the material has gone through several stations since it left the folding triangle 82 it sometimes becomes misaligned. The material goes through a set of pincher rollers 110, not shown. A photocell 112, not shown, is located precisely where the edge of the material is supposed to be located (one for each edge). If the photocell 112 does not detect the material, a pneumatic cylinder 114, not shown, moves the pincher rollers 110 at an angle which guides the material to where it is supposed to be.

Between fourth station 104 and a fifth station 116 on the open (inner) edge of the material the longitudinal seal ("LS") 34 is made. Now that the edge is again aligned by the rattle snake 108, the edges go between the LS sealing jaws 118, not shown. The outer sealing jaw has a heating ribbon that is heated by an impulse current which is regulated to achieve the temperature entered in the operator panel by the operator. The duration of the heating impulse is also entered by the operator. The heating ribbon is covered with Teflon tape. The inner jaw holds a counter rubber which is also covered with Teflon tape. The outer jaw is pneumatically controlled and moves towards the inner jaw, sandwiching the two open edges between the jaws. This forms a face to face or fin seal (sometimes called a praying seal). The outer jaw is water cooled to keep the temperature down when it is not heating. The material is held into the LS jaws 118 by the LS guide 120, not shown. The LS guide 120 consists of two pinching levers that pinch the material between them. These levers are lifted from the bottom of the LS jaws 118 to the top of the jaws by another pneumatic cylinder when they are not in their pinched position. The levers travel to the bottom of the LS jaws 118 when the material is indexed since they are pinched around the material. The levers are guided on two rods that are located next to and parallel to the LS sealing jaws 118. The material has now been formed into a tube.

Located between fifth station 116 and a sixth station 122 is the end of the filling pipe 102. The product is released into the tube once a transversal sealing (TS) jaws 124, not shown have been closed at point 126.

Several operations happen between the sixth station 122 and a seventh station 128. The first is material indexing. The TS jaws 124 close (pneumatically operated) around the material at point 126. If the machine 70 is filling product, the TS jaw assembly 130, not shown, raises (servo operated)

slightly causing the material to pouch out slightly and creating more room for the product. Then the entire jaw assembly 130 lowers to approximately at seventh station 128. The point where the indexing stops depends on when the design correction photocells 112 saw the bar-code and what state the machine is in. After the TS jaw assembly 130 reaches this bottom point the jaws open. Then the servo brings the TS jaw assembly 130 back to the beginning point 126 for the next cycle. This time when the jaws close the package that was just filled during the last cycle is now hanging below the TS jaw assembly 130, waiting to be sealed and cut from the tube.

The next operation is clamping. At the upper and lower edges of the TS jaw assembly 130 there are clamping bars 132, not shown. These bars 132 are spring loaded so that they come together before any other part of the jaw assembly 130. When the machine is in full operation the top clamps keep any product from getting into the area contained by the TS jaws 124 themselves (as this will be the handle portion of the package) and the bottom clamps have enough pressure to support the weight of a fully filled package as its cut seal is being made. There are also three seals begin made while the indexing is happening (a fourth seal is not being used at the moment). These seals happen while the TS jaw assembly 130 is closed. The top seal 38 is the seal that creates the flowable material section 12 of the container 10 and seals it off from the handle section 14. This seal 38 is created (ribbon, temperature and time control, Teflon tape) exactly like the LS seal 34. The next seal (moving from top to bottom of the jaw assembly) is the grip seal or elongated apertures 42. Currently this is a constantly heated sealing ribbon shaped like two letter "C" s lying next to each other. This sealing ribbon heats and cuts through the material to form the grip, elongated apertures 42 of the handle of the package. The next seal is the Cut seal 40. This seal is a T profile ribbon that seals the top of the handle section 14 (the material inside the TS jaw assembly 130) and seals the bottom 36 of the previously filled package (the one hanging below the TS jaw assembly 130) and cuts the two packages apart. Other than it being a T profile (as opposed to flat) and that it does not have Teflon over it, this operates exactly as the LS seal 34 and the diagonal seal 38. Transition from the vertical line 92 to the horizontal line 134. When the TS jaw assembly 130 is in its lowest position, the filled package that is hanging below the jaw assembly has just been sealed and cut (this will become the bottom seal of the package). When the jaws open in this lowered position the clamps are the last part of the jaw assembly to open, and then the filled and completely sealed package drops (a few millimeters) into a final folder cartridge 136.

The final folder cartridge 136 is indexed (servo controlled) to the eighth station 138. This station 138, the forming station, has many pneumatically controlled pressers and guides that form a guide of where the bottom triangular flaps 18 should go. The flaps 18 are then forced into place by pressing on the sides of the package and using the internal pressure of the package to expand the flaps 18. Then more presses move in to flatten the flaps 18 into two standing triangles. As the cartridge 136 is indexed from station 138 to ninth station 140, the flaps 18 are held in place by moving through guides. In ninth station 140, a lever 142, not shown, comes up from within the final folder and opens the sides of the cartridge 136 slightly. This allows the product to settle slightly lower in the package and leaves room for the sealing to take place. Then the flap sealing jaws swing down and clamp on the flaps 18. These seals are sometimes referred to as zebra seals. A series of four striped seals are made on each flap 18. These seals are impulse heated and controlled just like the LS and TS seals.

The final folder cartridge 136 is then index from ninth station 140 to a tenth station 144. During this index the package travels under two sets of hot glue applicators 146. The hot glue applicators 146 spray four lines of glue onto the bottom (the package is still up side down at this point) of the package. When the cartridge has reached tenth station 144 pressers move in to fold the flaps down onto the hot glue, thus securing them to the bottom of the package.

At area 148, the package rotates down towards the outfeed conveyor (not shown). Just before the package reaches the conveyor another lever reaches out and grabs the package and places it on the outfeed conveyor. The outfeed conveyor then takes the package to the crate packer.

The present invention will be further described in the following tables and examples which will further demonstrated the efficacy of the novel flexible container, however, the scope of the present invention is not to be limited by these tables and examples.

TABLE 1

Resin Types

|  | Resin Type |
| --- | --- |
| Resin A | C-4 LLD |
| Resin B | C-6 LLD |
| Resin C | MDPE |
| Resin D | ULDPE |
| Resin E | 2% EVA |
| Resin F | met-PE |
| Resin G | C-8 LLD |
| Resin H | LDPE |
| Resin I | HDPE |
| Resin J | Surlyn |

TABLE 2

Monolayer Films

|  |  | Thickness ($\mu$) |
| --- | --- | --- |
| Sample 1 | Resin A | 130 |
| Sample 2 | Resin B | 130 |
| Sample 3 | Resin C | 130 |
| Sample 4 | Resin D | 130 |
| Sample 5 | Resin G | 130 |
| Sample 6 | Resin H | 130 |
| Sample 7 | Resin I | 130 |
| Sample 8 | Resin C/Resin G | 130 |
| Sample 9 | Resin C/Resin B | 130 |
| Sample 10 | Resin I/Resin B | 130 |
| Sample 11 | Resin I/Resin G | 130 |

TABLE 3

Multilayer Films

|  | Extruder A | Extruder B | Extruder C | Thickness ($\mu$) |
| --- | --- | --- | --- | --- |
| Sample 12 | Resin A/Resin H | Resin A/Resin H | Resin A/Resin H | 150 |
| Sample 13 | Resin B | Resin B/Resin C | Resin B | 130 |
| Sample 14 | Resin B | Resin B/Resin C | Resin B/Resin D | 130 |
| Sample 15 | Resin B | Resin B/Resin C | Resin B/Resin F | 130 |

TABLE 3-continued

Multilayer Films

|  | Extruder A | Extruder B | Extruder C | Thickness ($\mu$) |
|---|---|---|---|---|
| Sample 16 | Resin F | Resin B/ Resin C | Resin E/ Resin B | 140 |
| Sample 17 | Resin J | Resin B/ Resin C | Resin E/ Resin B | 140 |
| Sample 18 | Resin D | Resin B/ Resin C | Resin E/ Resin B | 140 |

TABLE 4

Comparison of Mechanical Properties of 3 Layer Coextruded Films

|  | Sample 12 | Sample 13 | Sample 14 | Sample 15 | Sample 16 | Sample 17 | Sample 18 |
|---|---|---|---|---|---|---|---|
| Puncture |  |  |  |  |  |  |  |
| Peak Load (N) | 18.7 | 24.5 | 24.2 | 24.5 | 23.9 | 23.7 | 23.1 |
| Energy to Break (J) | 0.203 | 0.285 | 0.293 | 0.287 | 0.24 | 0.24 | 0.26 |
| Dart Drop |  |  |  |  |  |  |  |
| Max. Force (N) | 100 | 116 | 112 | 114 | 131 | 138 | 119 |
| Total Energy (J) | 1.1 | 1.35 | 1.31 | 1.32 | 1.5 | 1.5 | 1.4 |
| Elmendorf Tear |  |  |  |  |  |  |  |
| Force (gr) MD | 691 | 1139 | 1262 | 1573 | 1550 | 735 | 1480 |
| Force (gr) TD | 1507 | >1584 | >1584 | >1584 | >1584 | 900 | 1545 |
| Tensile (MD) |  |  |  |  |  |  |  |
| Yield Strength (MPa) | 11.34 | 15.07 | 14.78 | 14.27 | 14.7 | 15.3 | 13.7 |
| Ultimate Strength (MPa) | 29.8 | 43.4 | 44.1 | 43.5 | 40.2 | 23.1 | 41.3 |
| Elongation at Break (%) | 805 | 752 | 773 | 754 | 740 | 565 | 795 |
| Tensile (TD) |  |  |  |  |  |  |  |
| Yield Strength (MPa) | 11.48 | 16.03 | 15.93 | 15.13 | 15.4 | 15.6 | 14.1 |
| Ultimate Strength (MPa) | 26.6 | 43.2 | 42.3 | 41.1 | 37.9 | 20 | 38.1 |
| Elongation at Break (%) | 840 | 809 | 812 | 781.4 | 745 | 515 | 810 |

TABLE 5

Standability Comparison

|  | Standability |
|---|---|
| Sample 1 | 8.25 |
| Sample 2 | 11.13 |
| Sample 3 | 13.86 |
| Sample 4 | 7.5 |
| Sample 5 | 9.34 |
| Sample 6 | 8.63 |
| Sample 7 | 14.38 |
| Sample 8 | 13.6 |
| Sample 9 | 15.3 |
| Sample 10 | 15 |
| Sample 11 | 13.6 |

The exterior layer 54, which is extruder A on Table 3 improves the puncture scratch resistance of the film 50 and also improves the machinability of the material on the filling machine 70. Also, exterior layer 54 provides a surface for printing. Further, exterior layer 54 improves transportation resistance (shaker test).

The core layer(s) 56–60 give standability to the flexible container 10. For this reason, high density PE is blended with LLDPE to optimize density, flexibility, and elongation so that the blend provides a balance of standability and flex-cracking. This prevents the crack type failures on the flexible container 10 during transportation of flexible containers 10 fabricated from the film structure 50. Standability is an important feature of such flexible containers 10 which are alternative to traditional plastic bottles.

Interior layer 52 provides a sealing medium which is needed for the forming of the flexible container 10 and tightness of the flexible container 10. A blend of EVA with PE was found to work better than the PE in terms of hottack force, leakage rate of the flexible container 10 and impact resistance (seal strength) of the flexible container 10. However, other sealants such as ULDPE, metallocene PE, EMA, LLDPE and blends of these provide various benefits for the flexible container 10.

Standability is the defined as the highest angle between horizontal and an inclined table which a flexible container 10 can stand on for 15 seconds without rolling. It is measured for each side of the flexible container 10 by rotating flexible container 10 90 degrees after each measurement. Then the average of these four measurements is reported as standability value.

EXAMPLE ONE

The following structure is within the scope of the present invention.
Exterior: 100 parts of a hexene/ethylene copolymer
Core: 60 parts of hexene/ethylene copolymer blended with 40 parts of polyethylene having a density greater than 0.930.
Interior: 80 parts of hexene/ethylene copolymer blended with 20 parts of ethylene/vinyl acetate copolymer having a weight ratio of ethylene to vinyl acetate of 50:1.

EXAMPLE TWO

Exterior: 100 parts of a metallocene linear low density polyethylene;
Core: 60 parts of hexene/ethylene copolymer blended with 40 parts of polyethylene having a density greater than 0.930.
Interior: 80 parts of hexene/ethylene copolymer blended with 20 parts of ethylene/vinyl acetate copolymer having a weight ratio of ethylene to vinyl acetate of 50:1.

EXAMPLE THREE

Exterior: 100 parts of an ultra low density polyethylene;
Core: 60 parts of hexene/ethylene copolymer blended with 40 parts of polyethylene having a density greater than 0.930.
Interior: 80 parts of hexene/ethylene copolymer blended with 20 parts of ethylene/vinyl acetate copolymer having a weight ratio of ethylene to vinyl acetate of 50:1.

EXAMPLE FOUR

Exterior: 100 parts of a surlyn;
Core: 60 parts of hexene/ethylene copolymer blended with 40 parts of polyethylene having a density greater than 0.930.
Interior: 80 parts of hexene/ethylene copolymer blended with 20 parts of ethylene/vinyl acetate copolymer having a weight ratio of ethylene to vinyl acetate of 50:1.

Film structures 50 for the flexible container 10 made according to the Example 1–4 perform better than films having the interior, exterior and core layers all made of 80–100 parts of ethylene/butene copolymer blended with 0–20 parts of low density polyethylene in terms of puncture (handling), tearing, impact resistance and yielding under stress as demonstrated in Table Four. Under actual transportation conditions 4 liter flexible containers 10 made of material specified under the Example 1–4 show much less leakages than the ones made of 80 parts of ethylene/butene copolymer blended with 20 parts of high pressure polyethylene.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

We claim as our invention the following:

1. A pouch for a flowable food, the pouch fabricated from a multi-layer film, the flexible container comprising:
   an interior layer in contact with the flowable food, the interior layer comprising a blend of approximately 80 parts of a linear copolymer of ethylene and a $C_4$–$C_{10}$ alpha-olefin and approximately 20 parts of an ethylene vinyl acetate, the linear copolymer having a density between 0.900 to 0.930 g/cm$^3$ and a melt index of 0.20 to 2.0 dg/min, the ethylene vinyl acetate having a weight ratio of ethylene to vinyl acetate of 50:1 and a melt index of approximately 0.2 to 10 dg/min
   an exterior layer defining the exterior of the pouch; and
   at least one core layer interposed between the exterior layer and the interior layer, the at least one core layer composed of a blend of approximately 40 to 60 parts of a polyethylene material having a density greater than 0.930, approximately 40 to 60 parts of a linear copolymer of ethylene and a $C_4$–$C_{10}$ alpha-olefin having a density between 0.900 and 0.930 g/cm$^3$ and a melt index of 0.2 to 2.0 dg/min, and approximately from 0 to 10 parts of an additive.

2. The pouch according to claim 1 wherein the exterior layer is composed of a material selected from the group consisting of a metallocene catalyzed linear low density polyethylene, a linear copolymer of ethylene and a $C_4$–$C_{10}$ alpha-olefin, a polyethylene having a density between 0.916 and 0.930 g/cm$^3$, a polyethylene having a density between 0.930 and 0.950 g/cm$^3$, a polyethylene having a density between 0.950 and 0.970 g/cm$^3$, ethylene vinyl acetate and any mixture thereof.

3. The pouch according to claim 1 further comprising a barrier layer interposed between the exterior layer and the interior layer.

4. The pouch according to claim 1 wherein the exterior layer is a blend of approximately 10 to 100 parts of a metallocene catalyzed $C_4$–$C_{10}$ alpha-olefin polyethylene having a density between 0.88 to 0.93 g/cm$^3$ and a melt index of 0.2 to 2.0 dg/min, and approximately 0 to 90 parts of a polyethylene material.

5. A film structure for a pouch for a flowable food, the film structure comprising:
   an interior layer in contact with the flowable food, the interior layer comprising a blend of approximately 80 parts of a linear copolymer of ethylene and a $C_4$–$C_{10}$ alpha-olefin and approximately 20 parts of an ethylene vinyl acetate, the linear copolymer having a density between 0.900 to 0.930 g/cm$^3$ and a melt index of 0.20 to 2.0 dg/min, the ethylene vinyl acetate having a weight ratio of ethylene to vinyl acetate of 50:1 and a melt index of approximately 0.2 to 10 dg/min;
   an exterior layer defining the exterior of the pouch; and
   at least one core layer interposed between the exterior layer and the interior layer, the at least one core layer composed of a blend of approximately 40 to 60 parts of a polyethylene material having a density greater than 0.930, approximately 40 to 60 parts of a linear copolymer of ethylene and a $C_4$–$C_{10}$ alpha-olefin having a density between 0.900 and 0.930 g/cm$^3$ and a melt index of 0.2 to 2.0 dg/min, and approximately from 0 to 10 parts of an additive.

6. The film structure according to claim 5 wherein the exterior layer is composed of a material selected from the group consisting of metallocene catalyzed linear low density polyethylene, a linear copolymer of ethylene and a $C_4$–$C_{10}$ alpha-olefin, a polyethylene having a density between 0.916 and 0.930 g/cm$^3$, a polyethylene having a density between 0.930 and 0.950 g/cm$^3$, a polyethylene having a density between 0.950 and 0.970 g/cm$^3$, ethylene vinyl acetate and any mixture thereof.

7. The film structure according to claim 5 further comprising a barrier layer interposed between the exterior layer and the interior layer.

8. The film structure according to claim 5 wherein the exterior layer is a blend of approximately 10 to 100 parts of a metallocene catalyzed $C_4$–$C_{10}$ alpha-olefin polyethylene having a density between 0.88 to 0.93 g/cm$^3$ and a melt index of 0.2 to 2.0 dg/min, and approximately 0 to 90 parts of a polyethylene material.

* * * * *